JOHN H. BOFFEMMYER.
Improvement in Combined Fork and Band Cutters.
No. 123,671. Patented Feb. 13, 1872.
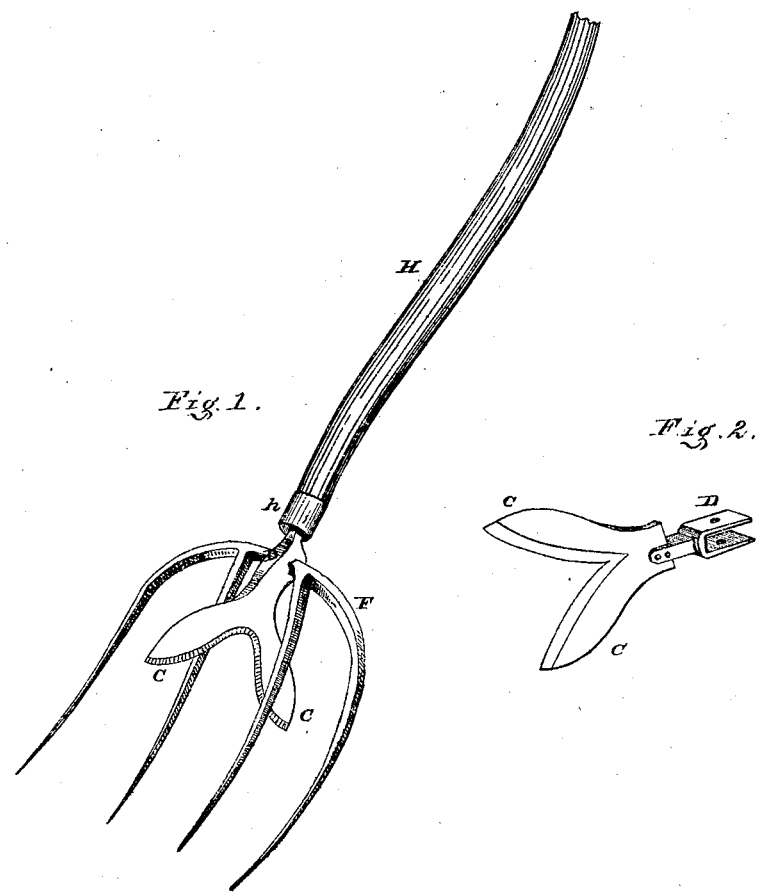

UNITED STATES PATENT OFFICE.

JOHN H. BOFFEMMYER, OF ENTERPRISE, PENNSYLVANIA.

IMPROVEMENT IN COMBINED FORK AND BAND-CUTTERS.

Specification forming part of Letters Patent No. 123,671, dated February 13, 1872.

Specification describing certain Improvements in a Combined Fork and Cutting-Blade, invented by JOHN H. BOFFEMMYER, of Enterprise, in the county of Lancaster and State of Pennsylvania.

This invention relates to an ordinary single four-pronged fork, provided with a fish-tail cutter, for the purpose of severing the bands around the sheaves of grain when thrashing with a machine. The accompanying drawing clearly shows my invention.

Figure 1 shows the fork and cutter combined with the handle. Fig. 2 shows a modification of said cutter.

I may briefly state that the fish-tail cutter C, Fig. 1 or 2, is connected to an ordinary four-pronged fork, F, with its handle H. Fig. 1 shows the cutting-blades united with the head and inserted into the handle H, and secured by the ring $h$. In Fig. 2 the bifurcate cutter is inserted into a slot in the shank of the head D and held by a screw-bolt.

This is a very simple and efficient implement, and of the greatest utility for handling sheaves of grain, and cutting the bands of straw around them, for feeding to the cylinder of a thrashing-machine.

I am aware that in patent No. 106,758 the combination of two forks with a cutting-blade between them is claimed; but I disclaim the use of a duplicated fork. My arrangement differs substantially, is more simple, lighter, and easier to handle, and fully as efficient. As a whole I deem it an improvement. Nor do I claim a fork with a simple cutting-blade, so constructed as to act in conjunction with the other tines of the fork. Also, I do not claim a V-shaped cutter, when so made as to slide by means of a lever, or otherwise; but

What I claim, and desire to secure by Letters Patent, is—

An ordinary four-tined fork F and handle H, when provided with a short furcated blade, C, having a shank or socket, D, all firmly united into a simple implement, in the manner shown and for the purpose specified.

JOHN H. BOFFEMMYER.

Witnesses:
 WM. B. WILEY,
 JACOB STAUFFER.